United States Patent [19]
Hammond

[11] 3,975,652
[45] Aug. 17, 1976

[54] NO-BACK CONTROL FOR A PERMANENT MAGNET ROTOR MOTOR

[75] Inventor: Robert J. Hammond, Stevensville, Mich.

[73] Assignee: V-M Corporation, Benton Harbor, Mich.

[22] Filed: Sept. 30, 1974

[21] Appl. No.: 510,384

[52] U.S. Cl. .................................. 310/41; 310/76; 310/164; 192/44
[51] Int. Cl.² ...................................... H02K 7/10
[58] Field of Search ............. 310/75, 75 C, 76, 162, 310/78, 163, 41, 164, 156, 67, 266, 92, 77; 318/362; 192/44, 45; 58/23 D

[56] References Cited
UNITED STATES PATENTS

| | | | |
|---|---|---|---|
| 3,333,125 | 7/1967 | Grabow | 310/41 |
| 3,333,129 | 7/1967 | Kohlhagen | 310/164 |
| 3,427,485 | 2/1969 | Dotto | 310/41 |
| 3,501,658 | 3/1970 | Morley | 310/41 |
| 3,518,031 | 6/1970 | Randall | 192/45 |
| 3,735,174 | 5/1973 | Bösch | 310/266 |
| 3,751,697 | 8/1973 | Morley | 310/41 |
| 3,767,019 | 10/1973 | Wingler | 192/45 |
| 3,809,932 | 5/1974 | Erwin | 310/41 |
| 3,842,296 | 10/1974 | Gerber | 310/41 |

FOREIGN PATENTS OR APPLICATIONS

| | | | |
|---|---|---|---|
| 1,178,641 | 5/1959 | France | 310/41 |

*Primary Examiner*—R. Skudy
*Attorney, Agent, or Firm*—Johnson, Dienner Emrich & Wagner

[57] ABSTRACT

The invention provides a quiet, reliable and quick acting "no-back" action for synchronous motors utilizing permanent magnet rotors which have minimum power in self-starting and are prone to be erratic in direction of starting. This fallibility arises at least in part from the expense and difficulty of working to the accuracy which would be required to make the motor less uncertain in starting.

8 Claims, 8 Drawing Figures

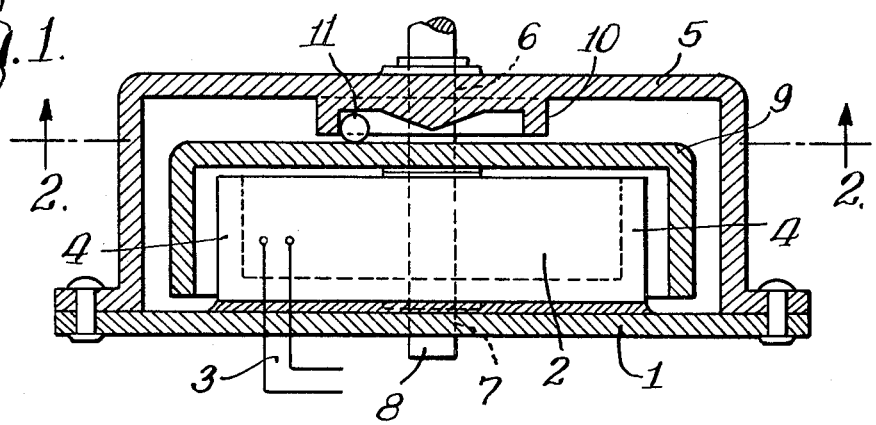
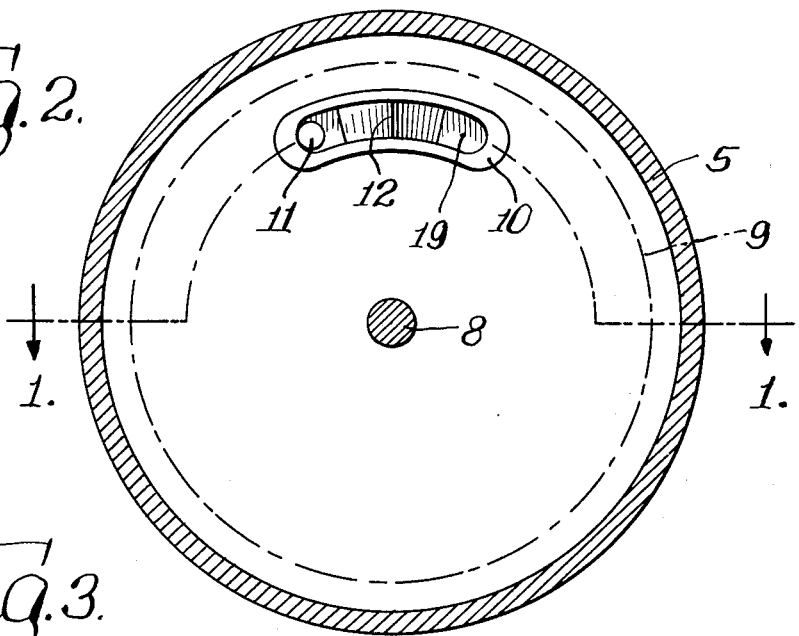
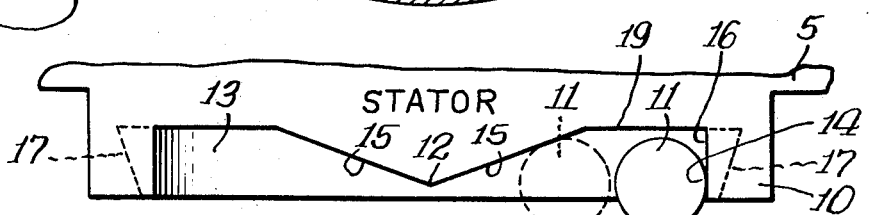
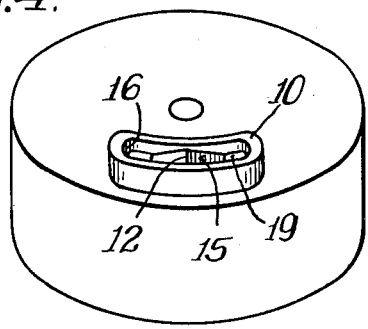
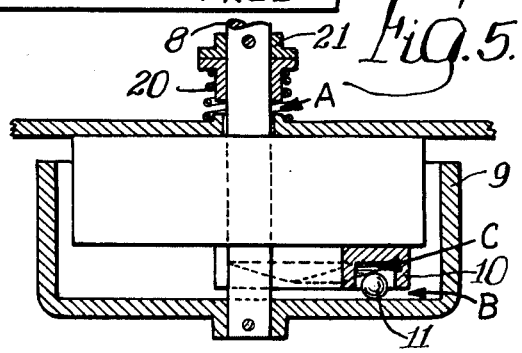

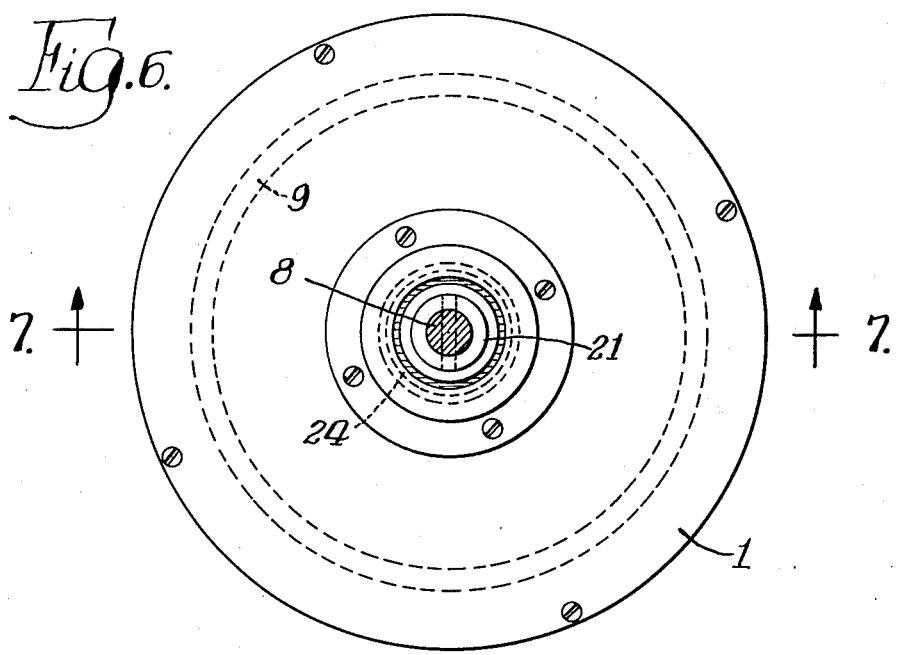
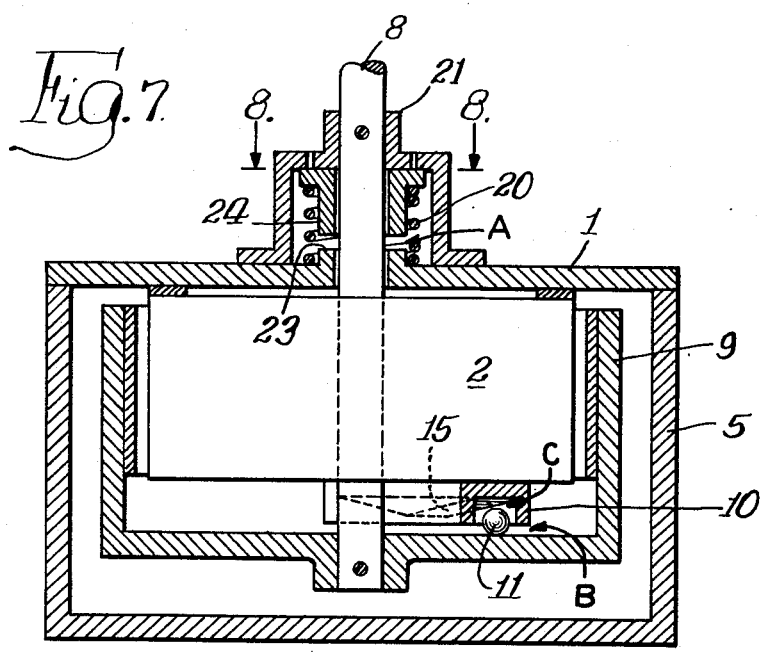
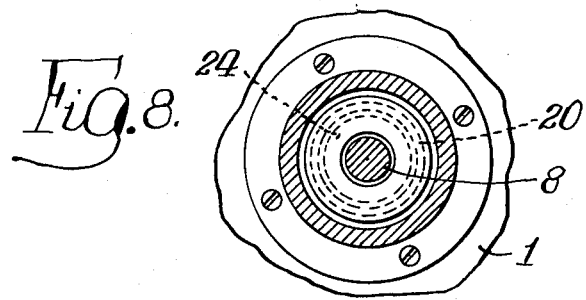

NO-BACK CONTROL FOR A PERMANENT MAGNET ROTOR MOTOR

BACKGROUND OF THE INVENTION

The present invention provides a unique combination with a permanent magnet rotor motor, of a no-back adjunct of low cost and high effectiveness and, the application of the invention to the permanent magnet type of synchronous motor introduces no noise making element. The key to the invention lies in the use of a small rubber ball or roller which is always in actual or potential contact with the rotor element to be invoked instantly upon occurrence of any reverse movement of the rotor, particularly in starting. The invention is low in cost and high in effectiveness.

OBJECTS OF THE INVENTION

The chief object of the invention is to provide an inexpensive and highly effective no-back service for a synchronous motor, particularly employing permanent magnet poles and wherein the motor is required to start against loads of varying resistance.

PERFORMANCE REQUIREMENTS

The requirements for a satisfactory no-back, or one-way clutch, mechanism and the reasons for such requirements include the following.

1. Low Static Friction

Permanent magnet rotor motors have specific rotor positions wherein starting torque is very low (a small fraction of running torque). If static friction from load, bearings, no-back resilient, automatic one-way roller clutch, etc. exceeds this minimum torque value, the motor will fail to start whenever the rotor is in a low torque position at rest.

2. Low Dynamic Friction

Friction caused by the no-back, when the motor is running, detracts from the output of the motor. It must be reduced to a minimum.

3. Short Reverse Rotation

If a motor is compliantly coupled with a high inertia load, forward movement of the rotor will be stopped when the torsional compliance of the coupling becomes sufficiently stressed. The rotor will then stop and reverse. If the reverse rotation allowed by the no-back is too great (approximately twice the rotation allowed by stall torque and drive compliance) the load will be started slowly or not at all, since the rotor will be free to oscillate.

4. Reverse Direction Compliance

Should the rotor start in the incorrect direction, a compliant stop by the no-back allows a smooth, quiet stop and also starts the rotor off again in the proper direction by releasing the rotational energy stored in the stopping process, simultaneously with the reversal of the sine wave current flow.

5. Quietness

In many applications, audible noise and minute vibration from the no-back must be held to an absolute minimum, both in stopping reverse rotation and when running in the correct direction.

The present invention provides a no-back construction that meets the above requirements and in addition is of low cost, dependable, and simple to produce.

A characteristic requirement is that the roller clutch element be continuously in contact with the movable motor element whereby the movable element has the option of starting and moving in the right direction by rolling the roller into contact with the vertical stop, or it has the option of rolling the roller into a narrowing passageway between the rotor member and a stationary wedge stop. An attempt to go in the wrong direction will tend to induce a rebound into the right direction which will then aid in getting started in the right direction.

IN THE DRAWINGS

FIG. 1 is a vertical section taken on the line 1—1 of FIG. 2;

FIG. 2 is a section taken on the line 2—2 of FIG. 1;

FIG. 3 is an enlarged side view showing the relation of the stator and rotor in the region of the no-back mechanism;

FIG. 4 is an enlarged isometric bottom view of the roller cage shown in FIG. 1;

FIG. 5 is a diagrammatic illustration of the utilization of the ball and incline of FIG. 3 to control a separate friction brake;

FIG. 6 is a top plan view of a synchronous motor employing the rolling ball and incline illustrated in FIG. 4;

FIG. 7 is a vertical axial section through the motor of FIG. 6; and

FIG. 8 is an enlarged view of the slidable mounting of the stationary friction or brake element which is energized under the control of the ball and incline illustrated in FIG. 3.

Referring now to FIGS. 1, 2 and 3, upon the base member 1 there is mounted the stator structure 2 which includes a winding supplied with alternating current through the leads 3. The stator structure 2 comprises a magnetic plate with upturned poles 4 energized by the said winding. The base member 1 has a cover 5 which supplies bearings at 6 and 7 for the motor shaft 8. Upon the motor shaft 8 there is mounted the permanent magnet rotor 9, of known form, comprising alternate north and south poles cooperating with the stationary field poles 4 to produce rotation of the said rotor 9 on its shaft 8 in the bearings 6, 7. A frame or cover member 5, mounted on the base plate 1, has a bearing guiding the upper end of the shaft 8 axially and rotarily. As may be seen from FIG. 2 the lower side of the horizontal wall of the housing 5 carries on its lower side the cage member 10 which holds the rubber ball or roller 11 in the arcuate runway shown in detail in FIGS. 2 and 4.

The arcuate cage 10 is illustrated on an enlarged scale in FIG. 3.

As here shown the cage is U-shaped in cross section (FIG. 5).

As here shown the cage 10 is in duplex form; that is to say, depending upon whether the roller 11 is on one side of the double incline portion 12 or the other, the roller 11 will serve to check rotary motion in one direction or the other. Thus by merely shifting the roller 11 from one of the double incline 12 to the other, the side roller will shift its control of direction of the rotor from left to right or right to left, as viewed in FIG. 3.

The same construction is shown in FIG. 4 in the perspective view without the roller being in said cage. The dotted line position of the roller 11 in FIG. 3 corresponds to motion of the rotor 4, as shown in FIG. 3, toward the left thereby wedging the roller 11 under the slanting wall of the projection 12 to stop relative motion of the rotor to the left in FIG. 3.

If it is desired to reverse the control of direction of motion of the rotor 4, the roller 11 will be removed from the position shown in FIG. 3 and introduced into the space 13 at the left of the double incline 12. As is apparent from FIGS. 2 and 3 in this embodiment, motion of the rotor to the right in FIG. 3 will roll the roller 11 against the end wall 14 of cage 10, and since the roller 11 does not fill the depth of the recess and is being pushed to the right in FIG. 3, it offers no substantial resistance to relative movement of the rotor 4 to the right as shown in FIG. 3.

Motion of the rotor to the right as shown in FIG. 3 is in the correct direction for free running of the motor in driving its load. As is frequently the case with a synchronous motor upon energization of the field winding, the rotor 4 may not start to the right in FIG. 3 which is its forward intended direction but will move to the left as shown in FIG. 3. This motion of the rotor will roll the roller 11 into wedging contact with the incline wall 15 of the cage thereby preventing further motion in that direction and storing energy for a rebound in the right direction.

When the rotor 4 moves in the correct direction— that is, to the right in FIG. 3—the rubber ball 11 is carried engagement engagment with the perpendicular stop surface 16 where it remains rolling on the moving rotor surface. The force against the perpencidular stop is from only that required to overcome rolling resistance of the ball. While this force is insignificant it may be reduced by sloping the surface slightly as shown by the dotted line 17 in FIG. 3.

The compliant stopping action of the no-back arrangement may be increased by allowing the rotor to move down as illustrated in FIG. 5 by virtue of the spring and lost motion permitted by the construction there shown. The space between the bottom 19 of the cage 10 and the rotor 4 provides freedom for the roller 11 to rotate in performing its functions. When the roller 11 is wedged between the incline surface 15 and the flat surface of the rotor 4, it is of course immobilized.

The spring 20 which allows the shaft 8 and the rotor 9 (FIG. 5) to be depressed, when the roller 11 rides up on the incline 15, allows greater distance in which the motion of the rotor may be absorbed when it starts up in the wrong direction.

The double inclines and stops allow the motor to be operated in either direction depending upon the placement of the ball or roller 11. The ball or roller 11 may be made of rubber or suitable plastic of substantially the characteristics of a modern tire tread of a pneumatic tire.

In FIGS. 6, 7 and 8 there is shown an embodiment of the invention in which the ball and incline illustrated and described in connection with FIG. 3 is utilized as a sensor or relay to activate the braking mechanism for stopping undesired backward motion of the rotor. It will be apparent that for a less powerful motor, i.e., that which would be required to operate only an indicator of some kind, such as a synchronous clock, the elastic ball 11 and the incline 15 could absorb the work of stopping the motion of the rotor starting to move in the wrong direction, but for a larger and higher powered synchronous motor the detecting function and the braking function should be separated. This is illustrated in FIGS. 6, 7 and 8. As shown diagrammatically in FIG. 5, the three significant gaps are the gaps A, B and C. The gap A occurs between the movable spring supported sleeve 24 which forms an axially yielding brake shoe restrained by the slotted inturned flange. Under the influence of spring 20, the said brake shoe member 24 is engaged at its upper end by the movable brake flange 21, which is keyed on shaft 8. The spring 20 maintains clearance between the sleeve 24 and the annular flange 23 on the casing 5 within the motion permitted axially of the shaft 8 for clearance purposes. Engagement of the ball 11 with the incline surface 15 pulls the rotatable armature 9 axially downwardly to close the gap A between the brake element 24 and the adjacent shoulder 23 on the casing 5. The spring 20 maintains the shiftable element 24 normally in contact with the rotatable flanged brake element 21. When the ball 11, riding on the incline 15, pushes the shaft and movable rotor element 8, 9 downwardly, the short gap at A is closed and the rotatable friction flange 21 on the shaft 8 engages the relatively stationary friction element 24 and tends to stop the rotary movement.

If the rotor 9 starts off in the right direction, the stator element of the motor is engaged by the ball 11 and the rotor runs free with no substantial energy loss by rolling of the ball towards the right in the diagram of FIG. 3. Thus it may be seen that the development of friction to stop the backward motion of the rotor is caused to occur between the members suited to the function of the brake. In this embodiment the ball and incline serve to trigger the braking action of the brake elements. In the embodiment of FIGS. 1 to 4, the ball 14 and incline 15 act as a wedge to stop motion in the reverse direction.

From the above description and explanation, those skilled in the art can construct an embodiment of the invention in which the ball and incline absorb the energy of stopping motion of the rotor in the wrong direction. Alternatively, the ball and incline may be employed to apply the brake elements to each other or separate them in accordance with whether the rotation is in the wrong direction or in the right direction.

The arrangement above described permits the roller 11 and incline 15 to provide immediate resistance to backward movement. If the force tending to produce said reverse motion is not more than is predetermined by the setting of the control spring 20, the contact alone may stop the reverse movement. If the force in the reverse direction is great enough to cause a displacement of the spring 20, the friction of the brake elements 21 and 24 is brought increasingly into play as determined by the characteristics of the control spring 22.

The details are obviously subject to variations within the skill of the art. The invention is defined in the appended claims.

I claim:

1. A one-way motor drive comprising in combination, a synchronous motor having a shaft, a permanent magnet rotor on said shaft, a field having magnetizable field poles and an AC field winding, and a mechanical one-way clutch mechanism, wherein the permanent magnet rotor has an upwardly facing horizontal circular track rotatable with the rotor, a stationary clutch member comprising a cage having an open bottom above the rotor registering with said track, a resilient rubber-like roller in said cage resting normally on said track, said cage having at one end a clutching surface inclined downwardly towards the track whereby movement of the rotor in the backward direction rolls said roller into wedging engagement with said downwardly inclined clutching surface and prevents backward rotation of the motor, and upon reversal of current assists in starting rotation of the rotor in the forward direction of rotation.

2. In combination in a synchronous AC motor a wound stator including stationary field poles, a permanent magnet rotor having poles cooperating with said field poles, means including a resilient automatic one-way clutch between the rotor and the stator to permit relative rotation between them in one direction of rotation of the rotor and to prevent rotary motion between them in the opposite direction, said means comprising an elastic rubber-like roller in free rolling contact with the rotor for one direction of rotation of the rotor and in wedging contact between the rotor and the frame member for the opposite direction of rotation of said parts relative to each other, and a spring acting endwise of the rotor shaft to absorb the energy of a wrong start and convert it into an assist to starting in the right direction.

3. The combination in a synchronous electric motor comprising a rotor having permanent magnet poles, a stator having an energizing winding and a number of stator poles at least equal to the number of rotor poles, a winding for the stator poles for cyclically shifting the polarity of the stator poles, a vertical drive shaft for the rotor, a one-way clutch between said rotor and said stator, said clutch comprising a resilient rubber ball, a downwardly facing oblong arcuate recess in the stator, an upwardly facing circular track carried by the rotor registering radially with said arcuate recess, said arcuate recess comprising a short horizontal runway of a width to receive said resilient rubber ball and of a depth slightly less than the diameter of said rubber ball, said recess terminating in an axially extending shoulder, said arcuate recess having at its end opposite said shoulder an inclined bottom wall extending from the bottom of the recess outwardly to the end thereof, said ball tending at all times to gravitate into contact with said circular track, said ball upon forward movement of the stator being advanced toward the said shoulder at the end of the recess and said ball upon backward movement of the rotor relative to the stator being pinched between the inclined bottom wall of the recess and the track of the rotor to stop said backward movement and to assist forward movement of the rotor upon the next forward impulse of the current flow.

4. The combination of claim 3 wherein the shoulder at the end of the recess is undercut to impart a lifting force to the ball tending to raise it above the moving rotor track during forward motion of the rotor.

5. The combination in a synchronous electric motor comprising a rotor having permanent magnet poles, a stator winding and a number of stator poles of a number at least equal to the number of rotor poles, means for cyclically shifting the magnetic fields of said stator poles, a vertical drive shaft for said rotor poles, a one-way clutch between said rotor and said drive shaft comprising an upwardly facing circular track in said rotor, an elastic rubber-like ball substantially continuously in contact with said rotor track, said stator having an arcuate recess facing downwardly towards the upwardly facing surface of the rotor track, said stator having at one end of the recess a downwardly extending shoulder substantially parallel to the axis of the motor shaft, a horizontally extending arcuate recess open on its lower side facing said track and terminating in an end wall against which the ball engages during forward motion of the rotor and a downwardly and backwardly inclined clutch surface on the bottom of said recess between which and the rotor track the ball is wedged by backward rotation of the rotor expansion of said ball occurring upon the next succeeding forward impulse of current and thereby assisting in starting the rotor to move forward in the right direction.

6. In combination in a permanent magnet synchronous motor means for preventing starting of the rotor in the reverse direction comprising a rotor having a shaft disposed vertically and having permanent magnet poles carried by said shaft and disposed parallel to said shaft, said motor having stationary field poles disposed in a circle and parallel to each other and to said rotor poles, and being disposed in a cylindrical array outside and parallel to said rotor poles, means for supporting said motor upon a horizontal base with the shaft substantially vertical and with the end surface of the stator facing downwardly, the inside surface of the upwardly facing end wall of the rotor having a circular flat track concentric with the rotor shaft, the downwardly facing wall of the lower end of the field poles bearing an arcuate cage open downwardly toward said circular track of the rotor, said cage comprising parallel arcuate side walls concentric about the axis of said rotor shaft and one end wall defined by vertical linear elements and the other end wall comprising an incline extending from the bottom of the arcuate cage to substantially the top of the side walls of said cage, there being a substantially short level runway between said end wall and said inclined wall and an elastic rubber-like roller guided in said arcuate cage and maintained by its own weight in contact with said circular track of the motor, said roller wedging between said inclined wall and the runway upon backward rotation of the rotor and expanding to assist forward rotation of the rotor upon reversal of magnetism of said field poles.

7. In combination in a synchronous motor having a frame, an elastic rubber-like clutching ball associated with said clutching member, a wound stator including stationary field pole pieces mounted on said frame, a cup-shaped permanent magnet rotor having a shaft and having poles cooperating with said field pole pieces, said rotor shaft extending vertically through the stator and through the frame, an inclined arcuate clutching member on said frame and a cooperating movable friction ring carried on said shaft and adapted to engage said ball with friction against said stationary friction ring for rotation in a reverse direction and to run freely with respect to said friction ring for rotation in a forward direction upon the succeeding reversal of magnetism in said field poles.

8. A synchronous motor having a stator comprising a field winding and stationary poles, a cup-shaped rotor opening upwardly, surrounding said stator and having a vertical shaft, said rotor providing a planar arcuate rotor track concentric with said shaft and facing upwardly, the stator having an arcuate stator track in the form of a groove inclined to the horizontal and overhanging and opening downwardly onto said arcuate rotor track, an elastic rubber-like roller carried between and cooperating with said rotor and stator tracks, said rotor and its shaft being movable vertically, a spring for holding said rotor and shaft against downward movement, and first and second brake elements connected with said stator and shaft, respectively, and being normally maintained out of frictional contact by said spring, said brake elements being responsive to the movement of said roller between said tracks, reverse movement of the rotor relative to the stator causing the roller to ride under the inclined rotor track in a reverse direction and to press the second brake element down against the first brake element, the component of pressure of the spring tending to force the roller to escape from pressure against the track, thereby assisting the next forward current impulse to start the rotor into synchronous motion in the forward direction.

* * * * *